US008301315B2

(12) United States Patent
Dawson et al.

(10) Patent No.: US 8,301,315 B2
(45) Date of Patent: Oct. 30, 2012

(54) SCHEDULING COOL AIR JOBS IN A DATA CENTER

(75) Inventors: Christopher J. Dawson, Arlington, VA (US); Vincenzo V. Diluoffo, Sandy Hook, CT (US); Rick A. Hamilton, II, Charlottesville, VA (US); Michael D. Kendzierski, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 627 days.

(21) Appl. No.: 12/486,216

(22) Filed: Jun. 17, 2009

(65) Prior Publication Data

US 2010/0324739 A1 Dec. 23, 2010

(51) Int. Cl.
*G05D 23/00* (2006.01)
*G06F 19/00* (2011.01)
(52) U.S. Cl. .................. 700/300; 713/300; 713/320
(58) Field of Classification Search .................. 700/299, 700/300; 713/300, 320
See application file for complete search history.

(56) References Cited

U.S. PATENT DOCUMENTS

| | | | |
|---|---|---|---|
| 6,487,463 B1 * | 11/2002 | Stepp, III | 700/79 |
| 6,574,104 B2 | 6/2003 | Patel et al. | |
| 6,868,682 B2 | 3/2005 | Sharma et al. | |
| 7,310,737 B2 * | 12/2007 | Patel et al. | 713/300 |
| 7,313,461 B2 * | 12/2007 | Sharma et al. | 700/245 |
| 7,640,760 B2 * | 1/2010 | Bash et al. | 62/178 |
| 7,726,144 B2 * | 6/2010 | Larson et al. | 62/259.2 |
| 7,742,844 B2 * | 6/2010 | Coxe, III | 700/300 |
| 8,001,407 B2 * | 8/2011 | Malone et al. | 713/323 |
| 2003/0193777 A1 | 10/2003 | Friedrich et al. | |
| 2007/0109725 A1 | 5/2007 | Lindell et al. | |
| 2007/0180280 A1 | 8/2007 | Bolan et al. | |
| 2007/0271475 A1 | 11/2007 | Hatasaki et al. | |

OTHER PUBLICATIONS

Tang, et al.; Thermal-Aware Task Scheduling to Minimize Energy Usage of Blade Server Based Datacenters; $2^{nd}$ IEEE International Symposium on Dependable, Autonomic and Secure Computing (DASC'06); 2006; pp. 1-8; IEEE Computer Society.
"Control Power and Cooling for Data Center Efficiency"; 4AA0-5820ENW, Jun. 2006; Hewlett-Packard Development Company, L.P.
Stapleton:; "Getting Smart About Data Center Cooling"; Nov. 2006, Hewlett-Packard Development Company, L.P.

* cited by examiner

*Primary Examiner* — Charles Kasenge
*Assistant Examiner* — Douglas Lee
(74) *Attorney, Agent, or Firm* — Brandon C. Kennedy; John R. Pivnichny; Biggers & Ohanian, LLP

(57) ABSTRACT

Scheduling cool air jobs in a data center comprising computers whose operations produce heat and require cooling, cooling resources that provide cooling for the data center, a workload controller that schedules and allocates data processing jobs among the computers, a cooling controller that schedules and allocates cooling jobs among cooling resources, including assigning data processing jobs for execution by computers in the data center; providing, to the cooling controller, information describing data processing jobs scheduled for allocation among the computers in the data center; specifying, by the cooling controller in dependence upon the physical location of the computer to which each job is allocated and the quantity of data processing represented by each job, cooling jobs to be executed by cooling resources; and assigning, by the cooling controller in accordance with the workload allocation schedule to cooling resources in the data center, cooling jobs for execution.

18 Claims, 6 Drawing Sheets

SCHEDULING COOL AIR JOBS IN A DATA CENTER

BACKGROUND OF THE INVENTION

1. Field of the Invention

The field of the invention is data processing, or, more specifically, methods, apparatus, and products for scheduling cool air jobs in a data center.

2. Description of Related Art

The development of the Electronic Discrete Variable Automatic Computer ('EDVAC') system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computer systems today are often organized in data centers. Such data centers may contain hundreds or thousands of computers whose operations produce heat and require cooling. Current methods of cooling computers involve maintaining an acceptable room temperature throughout the data center. That is, current methods only cool entire rooms without any consideration of the workloads of individual computers in the data center.

SUMMARY OF THE INVENTION

Methods, apparatus, and computer program products are disclosed for scheduling cool air jobs in a data center, the data center comprising computers whose operations produce heat and require cooling, cooling resources that provide cooling for the data center, a workload controller that schedules and allocates data processing jobs among the computers in the data center, a cooling controller that schedules and allocates cooling jobs among cooling resources in the data center, including assigning by the workload controller data processing jobs for execution by computers in the data center, the time when the workload controller assigns each data processing job defining a data processing workload schedule; providing, from the workload controller to the cooling controller, information describing data processing jobs scheduled for allocation among the computers in the data center, the information including the physical location of the computer to which each job is allocated, the quantity of data processing represented by each job, and the data processing workload schedule; specifying, by the cooling controller in dependence upon the physical location of the computer to which each job is allocated and the quantity of data processing represented by each job, cooling jobs to be executed by cooling resources, each cooling job comprising a quantity of cool air to be delivered to a physical location in the data center; and assigning, by the cooling controller in accordance with the workload allocation schedule to cooling resources in the data center, cooling jobs for execution.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXEMPLARY EMBODIMENTS

Figure 1:
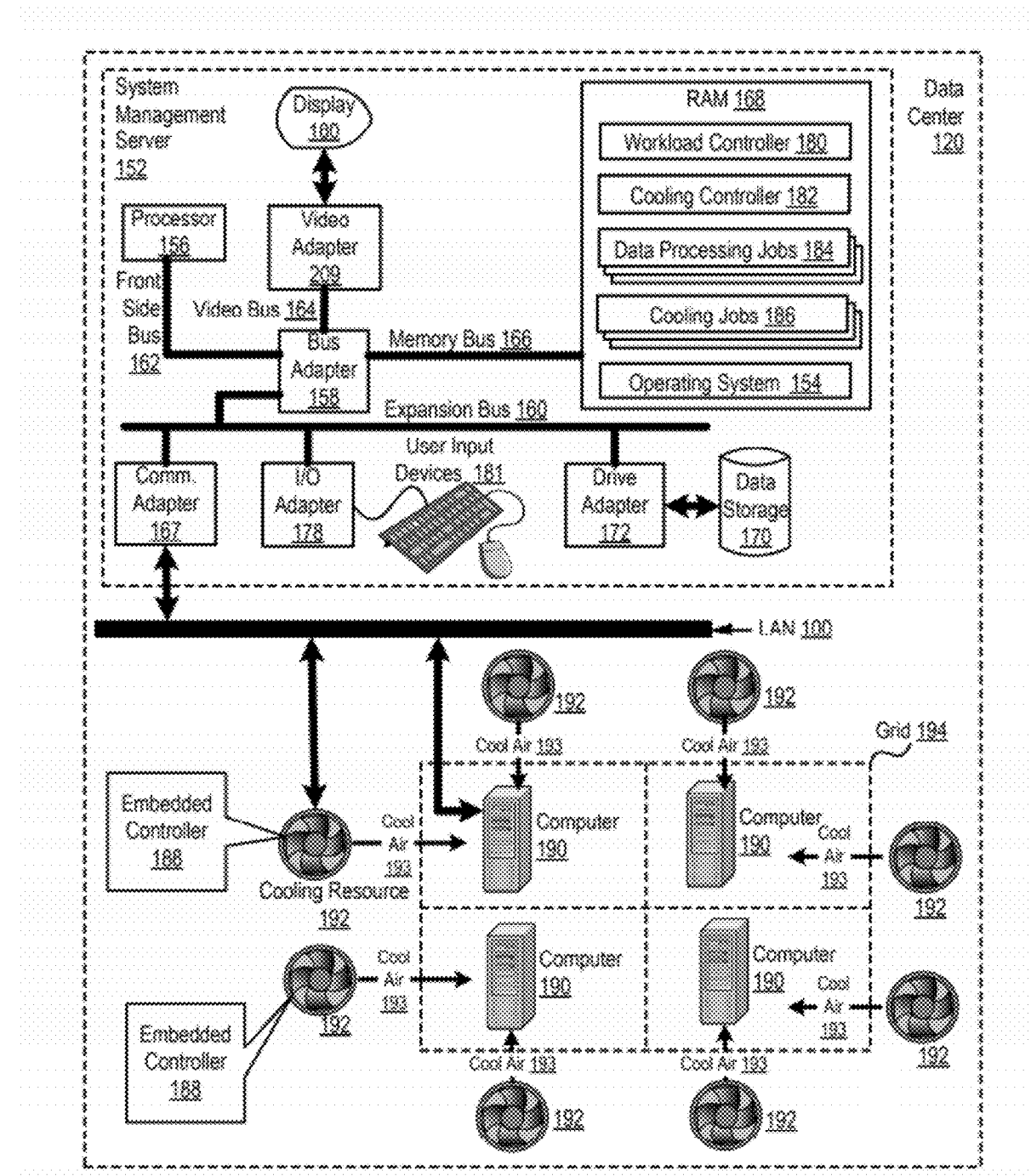
FIG. 1 sets forth a functional block diagram of an example apparatus implementing cool air job scheduling in a data center according to embodiments of the present invention.

Example methods, apparatus, and products for scheduling cool air jobs in a data center in accordance with embodiments of the present invention are described with reference to the accompanying drawings, beginning with FIG. 1. FIG. 1 sets forth a functional block diagram of an example apparatus implementing cool air job scheduling in a data center (120) according to embodiments of the present invention. The data center (120) is a facility used to house mission critical computer systems and associated components. The data center (120) serves as a centralized repository for the storage, management, and dissemination of data and information organized around a particular subject or pertaining to a particular business. A data center may exist within an organization's facilities or may be maintained as a specialized facility. Data centers vary in size from buildings filled with servers to a single server room or even to small computer closets.

The data center (120) of FIG. 1 includes a plurality of computers (190) whose operations produce heat and require cooling. In the example of FIG. 1, the computers are organized in a grid (194) and connected to a system management server (152) through a Local Area Network ('LAN') (100). Although only one of the computers (190) of FIG. 1 is depicted as being connected to the LAN (100), readers of skill in the art will recognize that all computers (190) in the data center (120) are connected to the LAN (100).

The data center (120) of FIG. 1 also includes cooling resources (192) that provide cooling for the data center. In this example, the cooling resources are represented as fans, but cooling resources (192) can be embodied, for example, as fans, as heating, ventilation, and air conditioning ('HVAC') systems that include compressors and vents for climate control, and in other ways as will occur to those of skill in the art. Although only two embedded controllers (188) are expressly depicted, each cooling resource (192) of FIG. 1 includes an embedded controller (188) for controlling the operation of each cooling resource (192). Each such embedded controller is coupled to processor (156) through LAN (100), communications adapter (167), expansion bus (160), bus adapter (158), and front side bus (162). Such embedded controllers may be built with a relatively simple CPU sometimes with a Von Neumann architecture, sometimes with a Harvard architecture, memory, and computer program instructions stored in memory that, when executed, control the operation of each cooling resource. Alternatively, an embedded controller may be built without a dedicated processor as such, instead built with a complex programmable logic device ('CPLD'), a field programmable logic array ('FPLA'), an application specific integrated circuit ('ASIC'), or in other ways that may occur to those of skill in the art. Controlling the operation of a cooling resource can include, for example, controlling the direction of air flow, controlling the amount of air flow, controlling the speed of a fan, the duration of fan or compressor operation, the direction of a vent louver, and so on. The embedded controllers (188) of FIG. 1 are designed for the specific task of controlling the operation of the cooling resources (192) and may be embodied as embedded microcontrollers, microprocessors coupled with non-volatile memory on a circuit board, a system on a chip ('SoC'), and so on.

The data center (120) of FIG. 1 also includes a system management server (152). The system management server (152) is a server in the data center (120) that automates many of the processes that are required to proactively manage computers (190) in the data center (120), including capacity planning, asset tracking, preventive maintenance, diagnostic monitoring, troubleshooting, firmware updates, and so on. The system management server (152) of FIG. 1 includes at least one computer processor (156) or 'CPU' as well as random access memory (168) ('RAM') which is connected through a high speed memory bus (166) and bus adapter (158) to processor (156) and to other components of the system management server (152).

Stored in RAM (168) is a workload controller (180) that schedules and allocates data processing jobs (184) among the computers (190) in the data center (120). The workload controller (180) of FIG. 1 is a module of automated computing machinery configured to operate by assigning data processing jobs (184) for execution by computers (190) in the data center (120). The workload controller may be implemented, for example, as a complex programmable logic device ('CPLD'), a field programmable logic array ('FPLA'), an application specific integrated circuit ('ASIC'), or, as shown here, as computer program instructions disposed in computer memory coupled to a computer processor. A data processing job (184), as the term is used here, is a defined data processing task, which, in order to execute, requires certain computer resources, such as CPU time, computer memory, input/output support, and so on. In the example of FIG. 1, assigning data processing jobs (184) for execution by computers (190) in the data center (120) is carried out by inserting a data processing job (184) into a job queue of a computer (190) that contains data processing jobs (184) to be executed on the computer (190). The workload controller then assigns data processing jobs to specific computers in the data center for execution by round-robin load balancing, by assigning a data processing job to the computer with the lowest CPU utilization rate, or in other ways as will occur to those of skill in the art.

In the example of FIG. 1, the time when the workload controller (180) assigns each data processing job (184) defines a data processing workload schedule. A data processing workload schedule can be embodied, for example, as illustrated in Table 1.

TABLE 1

| Data Processing Workload Schedule | | | | |
|---|---|---|---|---|
| Data Processing Job ID | Target Computer ID | Target Physical Location | Processing Workload (CPU cycles) | Scheduled Execution Start Time |
| 0001 | 0001 | 2 | 150 | 01:37:46 |
| 0002 | 0001 | 2 | 22000 | 01:37:47 |
| 0003 | 0002 | 1 | 35000 | 01:38:01 |
| 0004 | 0003 | 7 | 18000 | 01:38:30 |
| 0005 | 0004 | 9 | 6500 | 01:38:45 |

Each record in table 1 represents a data processing job that has been assigned to a computer in the data center. In the example of Table 1, each data processing job includes a data processing job identifier ('ID') and the identity of the computer to which the data processing job has been assigned. The identity of the target computer may be implemented, for example, as a logical location of the target computer, a network address, an internet protocol address, an Ethernet or MAC ('Media Access Control') address, and so on. In addition to the identity of the target computer, each record in Table 1 also includes the physical location of the target computer, expressed here as a simple grid cell number. Each record in Table 1 also includes a data processing workload, which is expressed as a number of CPU cycles that are required to complete the data processing job. A data processing workload can also be expressed as, for example, the amount of memory needed to execute the data processing job, the amount of time needed to execute the data processing job, and so on as will occur to those of skill in the art. Each record in Table 1 also includes a time stamp indicating the time at which the data processing job is scheduled to begin execution.

In the example of FIG. 1, the workload controller (180) also provides information to the cooling controller (182) describing data processing jobs (184) scheduled for allocation among the computers (190) in the data center (120). Such information includes the physical location of the computer to which each job is allocated, the quantity of data processing represented by each job, and the data processing workload schedule. Such information can be provided to the cooling controller, for example, through the use of known method for inter-process communications, by passing the information to the workload controller as parameters in a function call to the cooling controller, by placing the information in a segment of shared memory, and in other ways as will occur to those of skill in the art.

In the example of FIG. 1, also stored in RAM (168) is a cooling controller (182). The cooling controller may be implemented, for example, as a complex programmable logic device ('CPLD'), a field programmable logic array ('FPLA'), an application specific integrated circuit ('ASIC'), or, as shown here, as computer program instructions disposed in computer memory coupled to a computer processor. The cooling controller (182) of FIG. 1 schedules and allocates cooling jobs (186) among cooling resources (192) in the data center (120). In the process of scheduling and allocating, the cooling controller (182) of FIG. 1 first specifies, in dependence upon the physical location of the computer (190) to which each data processing job (184) is allocated and the quantity of data processing represented by each data processing job (184), the cooling jobs (186) to be executed by cooling resources (192). In the example of FIG. 1, each specification of a cooling job (186) includes a quantity of cool air to be delivered to a physical location in the data center. In the example of FIG. 1, a quantity of cool air can be specified in terms of cubic feet per minute across an HVAC system, as a speed setting for a fan, and so on. In the example of FIG. 1, the physical location of a computer in a data center can be specified in terms of the computers grid coordinates. Specifications of cooling jobs are further described with reference to Table 2.

TABLE 2

Cooling Job Specifications

| Cooling Job ID | Target Physical Location | Target Cooling Resource | Quantity of Cool Air | Scheduled Execution Start Time |
|---|---|---|---|---|
| 0001 | 2 | 0001 | 1000 | 01:30:00 |
| 0002 | 2 | 0001 | 1000 | 02:00:00 |
| 0003 | 1 | 0002 | 1000 | 01:38:00 |
| 0004 | 1 | 0003 | 1000 | 01:38:00 |
| 0005 | 7 | 0004 | 1000 | 01:40:00 |
| 0006 | 9 | 0005 | 1000 | 01:50:00 |

Each record of Table 2 specifies a cooling job by use of a cooling job identifier ('ID'), a target physical location to which a quantity of cool air is to be delivered, a target cooling resource to which a cooling job is assigned, a quantity of cool air to be provided by the cooling resource, and a scheduled execution time for the cooling job. Because the cooling controller in many embodiments will communicate a cooling job to a cooling resource via data communications network, the identity of the target cooling resource may be implemented, for example, as a logical location of the target computer, a network address, an internet protocol address, an Ethernet or MAC address, and so on. The target physical location to which the cool air is to be delivered is expressed here as a simple grid cell number, 2, 1, 7, 9.

In the example of Table 2, the quantity 1000 cubic feet of cool air is set as a system parameter so that each cooling job provides that amount of cool air. In this example, the cooling controller determined that the data processing job executing in location 2 requires more than 1000 cubic feet of cool air, and the cooling controller therefore specified two cooling jobs for that location a half hour apart, jobs 0001 and 0002. The cooling controller also determined that a data processing job running in physical location 1 requires more than 1000 cubic feet of cool air and scheduled two cooling jobs at the same time from two separate cooling resources, jobs 0003 and 0004.

In the example of FIG. 1, the cooling controller (182) also assigns, in accordance with the workload allocation schedule to cooling resources (192) in the data center (120), cooling jobs (186) for execution. A cooling job (186), as the term is used here, represents a cooling task to be performed by a cooling resource, delivering a quantity of cool air to a physical location in a data center. A cooling job may be implemented as a set of instructions to be carried out by a cooling resource that, when executed, control the operation of the cooling resource. Such instructions can include, for example, parameters that indicate how long a cooling resource should run, at what capacity the cooling resource should run, compressor speed, fan speed, vent louver directions, and so on. Such instructions can be executed by an embedded controller of the cooling resource.

Also stored in RAM (168) is an operating system (154). Operating systems useful in scheduling cool air jobs in a data center according to embodiments of the present invention include UNIX™, Linux™, Microsoft XP™, AIX™, IBM's i5/OS™, and others as will occur to those of skill in the art. The operating system (154), workload controller (180), cooling controller (182), data processing jobs (184), and cooling jobs (186) in the example of FIG. 1 are shown in RAM (168), but many components of such automation typically are stored in non-volatile memory also, such as, for example, on a disk drive (170).

The computer (152) of FIG. 1 includes disk drive adapter (172) coupled through expansion bus (160) and bus adapter (158) to processor (156) and other components of the system management server (152). Disk drive adapter (172) connects non-volatile data storage to the system management server (152) in the form of disk drive (170). Disk drive adapters useful in computers for reporting and processing computer operation failure alerts according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example system management server (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example system management server (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example system management server (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for reporting and processing computer operation failure alerts according to embodiments of the present invention include modems for wired dial-up communications, Ethernet (IEEE 802.3) adapters for wired data communications network communications, and 802.11 adapters for wireless data communications network communications.

The arrangement of the system management server, the cooling resources (192), other computers (190) and other devices in the example data center of FIG. 1 are for explanation, not for limitation. Systems and apparatus for scheduling cool air jobs in a data center according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
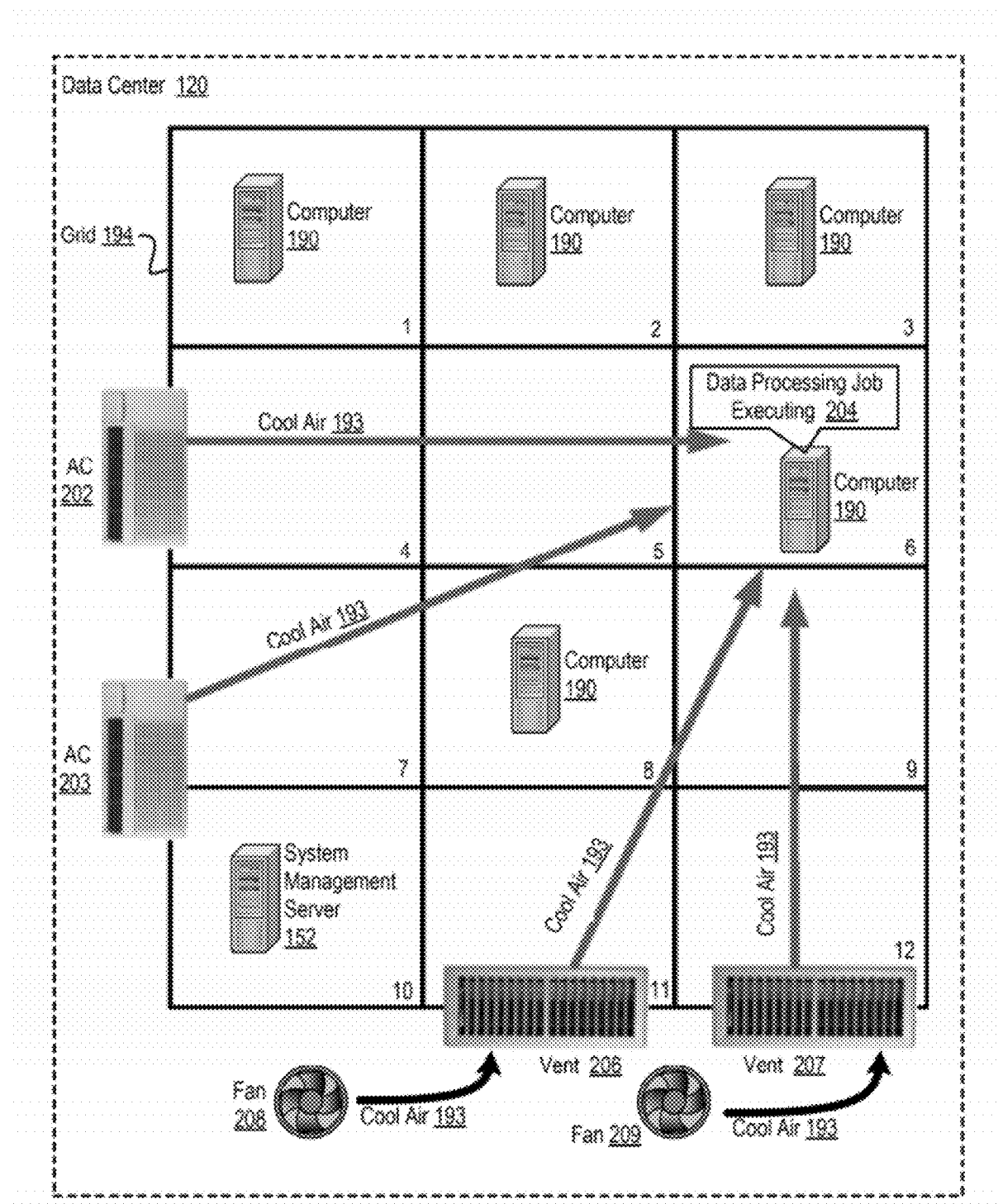
FIG. 2 sets forth a line drawing of example apparatus in a use case for scheduling cool air jobs in a data center according to embodiments of the present invention.

For further explanation, FIG. 2 sets forth a line drawing of example apparatus in a use case for scheduling cool air jobs in a data center (120) according to embodiments of the present invention. The example of FIG. 2 includes a data center (120) that includes a plurality of computers and cooling resources as described above with reference to FIG. 1. The data center of FIG. 2 also includes a system management server (152) like the one described above with reference to FIG. 1, a system management server coupled to cooling resources through a local network including a workload controller (180 of FIG. 1), a cooling controller (182 of FIG. 1), data processing jobs (184 of FIG. 1), and cooling jobs (186 of FIG. 1). In the example of FIG. 2, the cooling resources (192) are disposed within the data center (120) so as to provide cool air to the computers in the data center in a pattern of a grid (194). The grid (194) of FIG. 2 includes 12 cells that a computer can be located within. Each cell in the grid of FIG. 2 has a unique identifier to identify the cell. In the example of FIG. 2, computers (190) are located within cells 1, 2, 3, 5, and 8 of the grid (194).

In the example of FIG. 2, the workload controller assigns data processing jobs for execution by computers in the data center (120). As described above with reference to FIG. 1, the time at which the workload controller assigns each data processing job defines a data processing workload schedule. In the example of FIG. 2, the workload controller has assigned a data processing job to the computer in cell 6 of the grid (194) and all other computers in the grid (194) are not executing data processing jobs. The data processing job assigned to the computer in cell 6 is scheduled to execute on the computer in cell 6 from 1 A.M. until 2:30 A.M.

In the example of FIG. 2, the workload controller provides information to the cooling controller describing data processing jobs scheduled for allocation among the computers in the data center (120). The information provided to the cooling controller includes the physical location of the computer to which each job is allocated, the quantity of data processing represented by each job, and the data processing workload schedule. In the example of FIG. 2, the workload controller would provide the cooling controller information indicating that a data processing job has been assigned to the computer in cell 6 of the grid, information indicating that the data processing job will require the computer's resources for 90 minutes, and that the data processing job will begin at 1 A.M.

In the example of FIG. 2, the cooling controller specifies cooling jobs to be executed by cooling resources in dependence upon the physical location of the computer to which each data processing job is allocated and the quantity of data processing represented by each data processing job. Each cooling job includes a quantity of cool air to be delivered to a physical location in the data center. In the example of FIG. 2, the cooling controller specifies six cooling jobs to be carried out by the six cooling resources (202, 203, 206, 207, 208, and 209) in FIG. 2. Each cooling job instructs the cooling resources to direct cool air (193) towards the only computer that is executing a data processing job (204), which is the computer located in cell 6 of the grid. Each cooling job instructs each cooling resource to operate at full capacity for 90 minutes.

In the example of FIG. 2, the cooling controller assigns cooling jobs for execution to cooling resources in the data center in accordance with the workload allocation schedule. The workload allocation schedule of FIG. 2 indicates that the only computer that will be executing data processing jobs is the computer in cell 6 of the grid. In the example of FIG. 2, the cooling controller assigns the six cooling jobs created above to the six cooling resources (202, 203, 206, 207, 208, and 209) depicted in FIG. 2. Each cooling resource is assigned one cooling job and each cooling job instructs the resources to direct cool air (193) towards cell 6 in the grid at full capacity for the next 90 minutes.

In this example a cooling controller, in dependence on the characteristics of the data processing job executing on the computer in grid 6, specifies cooling jobs for the six cooling resources depicted in FIG. 2 that cause the cooling resources to carry out the following cooling tasks:

Vent (206) is directed to turn its louvers toward cell 6.

Vent (207) is directed to turn its louvers toward cell 6.

Fan (208) is directed to repeatedly blow a predefined quantity of cool air through vent (206), optionally at predefined intervals, beginning at 1:00 a.m. and continuing until 2:30 a.m. Depending on the predefined quantity of cool air that composes a cooling job for fan (208), this may require the specification and scheduling of more than one cooling job for fan (208).

Fan (209) is directed to repeatedly blow a predefined quantity of cool air through vent (207), optionally at predefined intervals, beginning at 1:00 a.m. and continuing until 2:30 a.m. Depending on the predefined quantity of cool air that composes a cooling job for fan (209), this may require the specification and scheduling of more than one cooling job for fan (209).

AC unit (202) is directed to repeatedly blow a predefined quantity of cool air toward cell 6, optionally at predefined intervals, beginning at 1:00 a.m. and continuing until 2:30 a.m. Depending on the predefined quantity of cool air that composes a cooling job for AC unit (202), this may require the specification and scheduling of more than one cooling job for AC unit (202).

AC unit (203) is directed to repeatedly blow a predefined quantity of cool air toward cell 6, optionally at predefined intervals, beginning at 1:00 a.m. and continuing until 2:30 a.m. Depending on the predefined quantity of cool air that composes a cooling job for AC unit (203), this may require the specification and scheduling of more than one cooling job for AC unit (203).

This example depicts a fan and a vent as two separate cooling resources, but readers will recognize that a fan and a vent, or a compressor, fan, and vent, can be implemented together as a single cooling resource and provided with cooling control through a single embedded controller.

Figure 3:
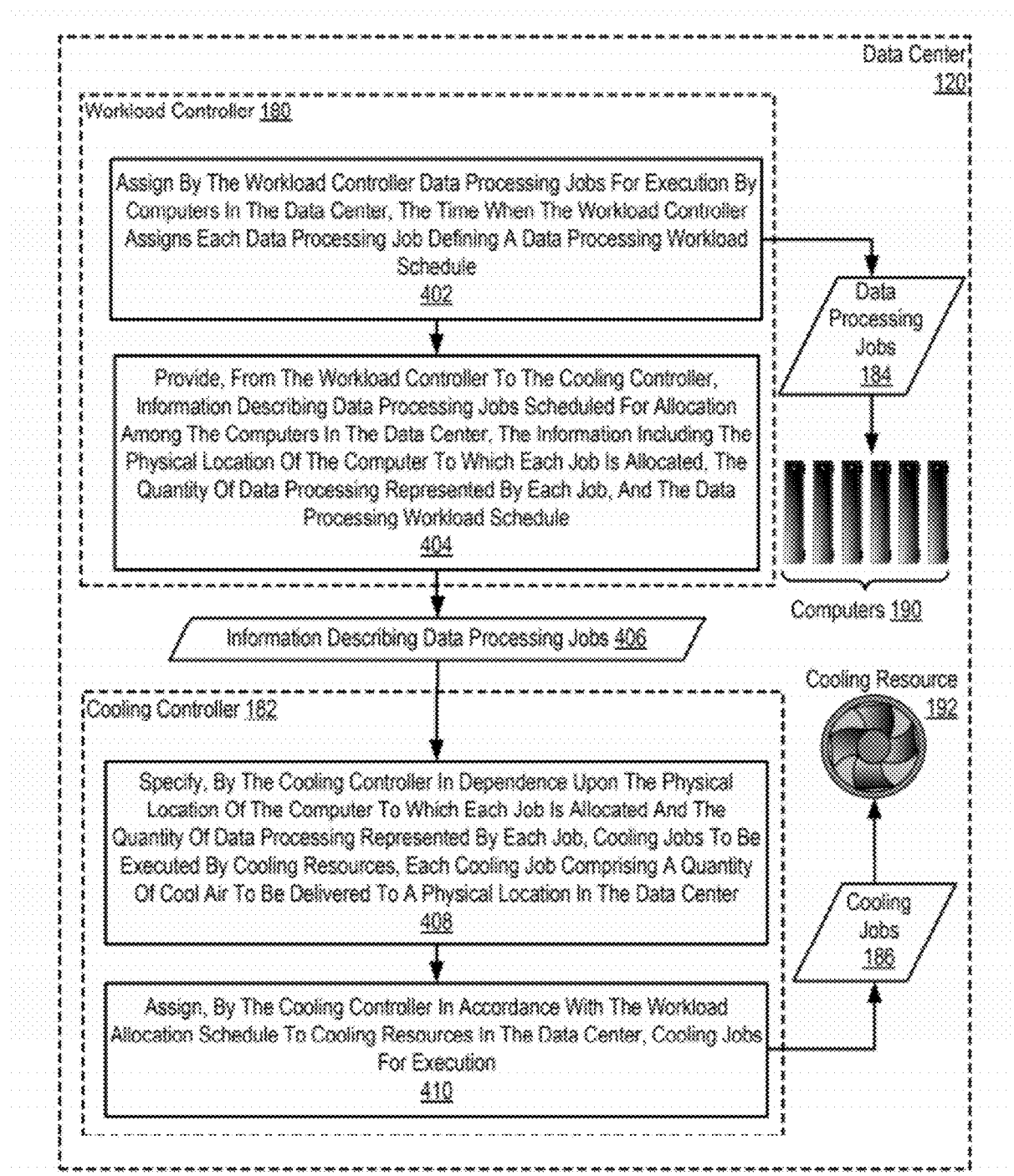
FIG. 3 sets forth a flow chart illustrating an example method of scheduling cool air jobs in a data center according to embodiments of the present invention.
Figure 4:
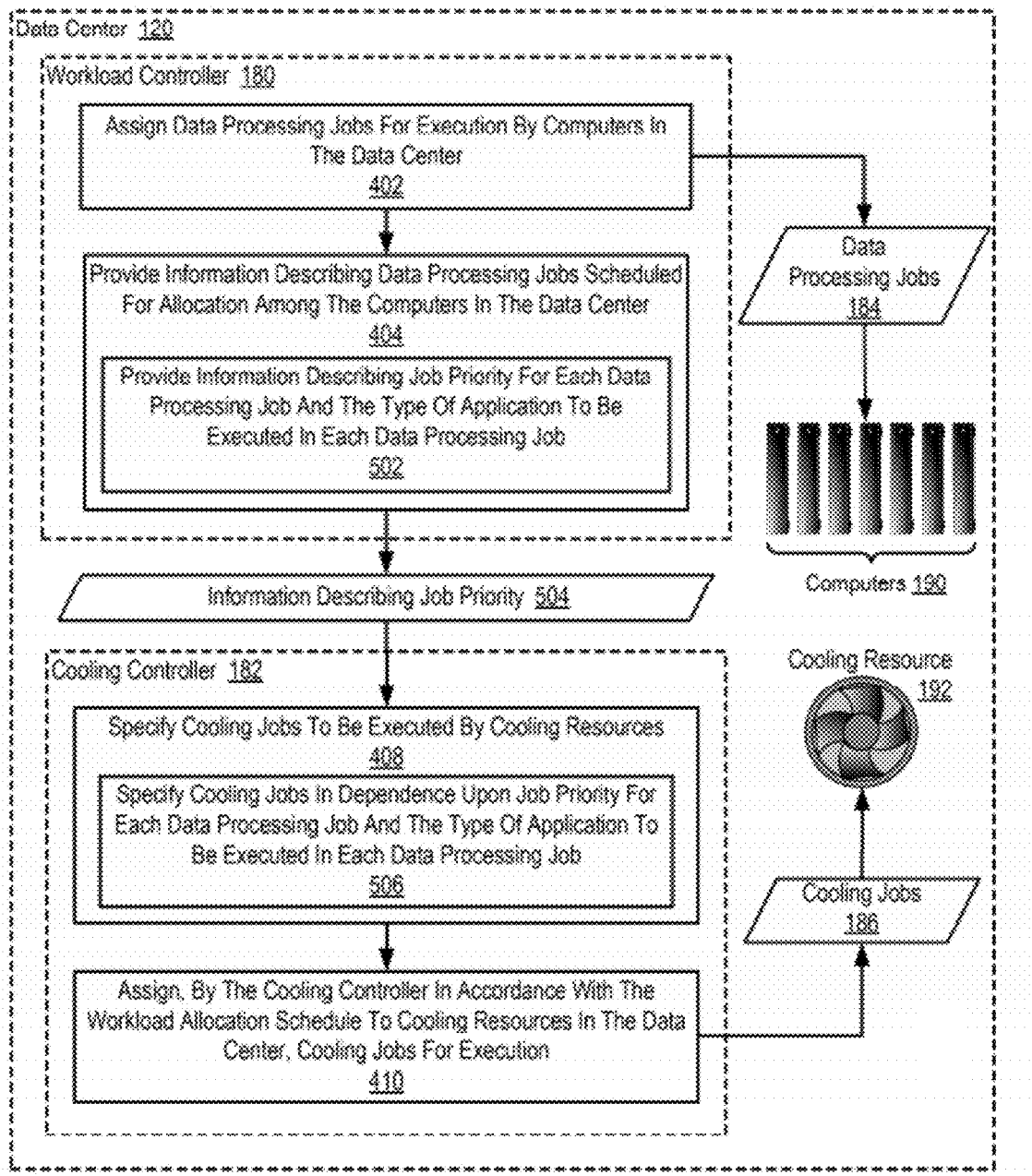
FIG. 4 sets forth a flow chart illustrating an example method of scheduling cool air jobs in a data center according to embodiments of the present invention.

For further explanation, FIG. 3 sets forth a flow chart illustrating an example method of scheduling cool air jobs in a data center according to embodiments of the present invention. The data center (120) is similar to the data center as described above with reference to FIG. 1, including as it does, computers (190) whose operations produce heat and require cooling, cooling resources (192) that provide cooling for the data center (120), a workload controller (180) that schedules and allocates data processing jobs (184) among the computers in the data center, and a cooling controller (182) that schedules and allocates cooling jobs (186) among cooling resources in the data center. The method of FIG. 4 is implemented in a data center with a data processing job controller, a cooling job controller, and cooling resources similar to those depicted in and described above with regard to FIG. 1.

The example of FIG. 3 also includes assigning (402) by the workload controller (180) data processing jobs (184) for execution by computers (190) in the data center (120). In the example of FIG. 3, a data processing job (184) is a defined data processing task, which, in order to execute, requires certain computer resources, such as CPU time, computer memory, input/output support, and so on. Assigning data processing jobs for execution by computers in the data center is carried out, for example, by inserting a data processing job (184) into a job queue of a computer (190). Data processing jobs are assigned to specific computers in the data center for execution by round-robin load balancing, by assigning a data processing job to the computer with the lowest CPU utilization rate, or in other ways as will occur to those of skill in the art.

In the example of FIG. 3, the time or times when the workload controller (180) assigns each data processing job (184) defines a data processing workload schedule. One example of such a data processing workload schedule is described above with reference to Table 1. In the example of Table 1, each data processing job is associated with a data processing job identifier and the computer that the data processing job has been assigned to is identified by a target computer identifier. Each record includes a data processing workload, which is expressed as a number of CPU cycles that are required to complete the data processing job. A data processing workload can also be expressed as, for example, the amount of memory needed to execute the data processing job, the amount of time needed to execute the data processing job, and so on as will occur to those of skill in the art. Each record in Table 1 also includes a time stamp indicating the time at which the data processing job is scheduled to begin execution.

The example of FIG. 3 also includes providing (404), from the workload controller (180) to the cooling controller (182), information (406) describing data processing jobs scheduled for allocation among the computers (190) in the data center (120). In the example of FIG. 3, such information (406) includes the physical location of the computer to which each job is allocated, the quantity of data processing represented by each job, and the data processing workload schedule. This information can be provided to the cooling controller, for example, through the use of known methods for inter-process communications, shared memory segments, named pipes, parameters in a function call to the cooling controller, and in other ways as will occur to those of skill in the art.

The example of FIG. 3 also includes specifying (408), by the cooling controller (182) in dependence upon the physical location of the computer (190) to which each data processing job (184) is allocated and the quantity of data processing represented by each data processing job, cooling jobs (186) to be executed by cooling resources (192). Examples of specifications of cooling jobs are described above with reference to Table 2. In the example of FIG. 3, as shown in Table 2, each cooling job (186) includes a quantity of cool air to be delivered to a physical location in the data center. In the example of FIG. 3, a quantity of cool air can be specified in terms of cubic feet per minute across an HVAC system, as a speed setting for a fan, and so on. In the example of FIG. 3, the physical location of a computer in a data center can be specified in terms of the computer's grid coordinates such as, for example, a grid cell number.

The example of FIG. 3 also includes assigning (410), by the cooling controller (182) in accordance with the workload allocation schedule to cooling resources (192) in the data center (120), cooling jobs (186) for execution. A cooling job (186), as the term is used here, represents a cooling task to be performed by a cooling resource, delivering a quantity of cool air to a physical location in a data center. A cooling job may be implemented as a set of instructions to be carried out by a cooling resource that, when executed, control the operation of the cooling resource. Such instructions can include, for example, parameters that indicate how long a cooling resource should run, at what capacity the cooling resource should run, compressor speed, fan speed, vent louver directions, and so on. Such instructions can be executed by an embedded controller of the cooling resource.

For further explanation, FIG. 4 sets forth a flow chart illustrating a further example method for scheduling cool air jobs in a data center according to embodiments of the present invention. The method of FIG. 4 is similar to the method of FIG. 3, including as it does, assigning (402) data processing jobs for execution by computers in the data center, providing (404) information describing data processing jobs scheduled for allocation among the computers in the data center, specifying (408) cooling jobs to be executed by cooling resources, and assigning (410), by the cooling controller (182) in accordance with the workload allocation schedule to cooling resources (192) in the data center (120), cooling jobs (186) for execution. The method of FIG. 4 is implemented in a data center with a data processing job controller, a cooling job controller, and cooling resources similar to those depicted in and described above with regard to FIG. 1.

In method of FIG. 4, however, providing information describing data processing jobs includes providing (502) information (504) describing job priority for each data processing job and the type of application to be executed in each data processing job. Information describing job priority can include classifying a data processing job according to predetermined priority classifications such as, for example, "low," "medium," or "high." Information describing job priority can include, for example, assigning a relative priority ranking to each data processing job (184) assigned for execution by a workload controller (180), such that the highest ranked data processing job has a ranking of "1," the second highest ranked data processing job has a ranking of "2," and so on. In the example of FIG. 4, information describing type of application to be executed in each data processing job can include, for example, information describing the data processing job as a system-level job, an application-level job, and so on as will occur to those of skill in the art.

In the method of FIG. 4, specifying cooling jobs includes specifying (506) cooling jobs in dependence upon job priority for each data processing job and the type of application to be executed in each data processing job. Specifying cooling jobs in dependence upon job priority for each data processing job can be carried out, for example, by scheduling cooling jobs that are associated with the highest ranked data processing jobs first, and scheduling subsequent cooling jobs only if there are enough cooling resources remaining so as to service those cooling jobs associated with lower ranked cooling jobs. In the method of FIG. 4, specifying cooling jobs in dependence upon the type of application to be executed in each data processing job can be carried out, for example, by scheduling cooling jobs that are associated with system-level data processing jobs first, and scheduling subsequent cooling jobs associated with application-level jobs only if there are enough cooling resources remaining so as to service those cooling jobs.

Figure 5:
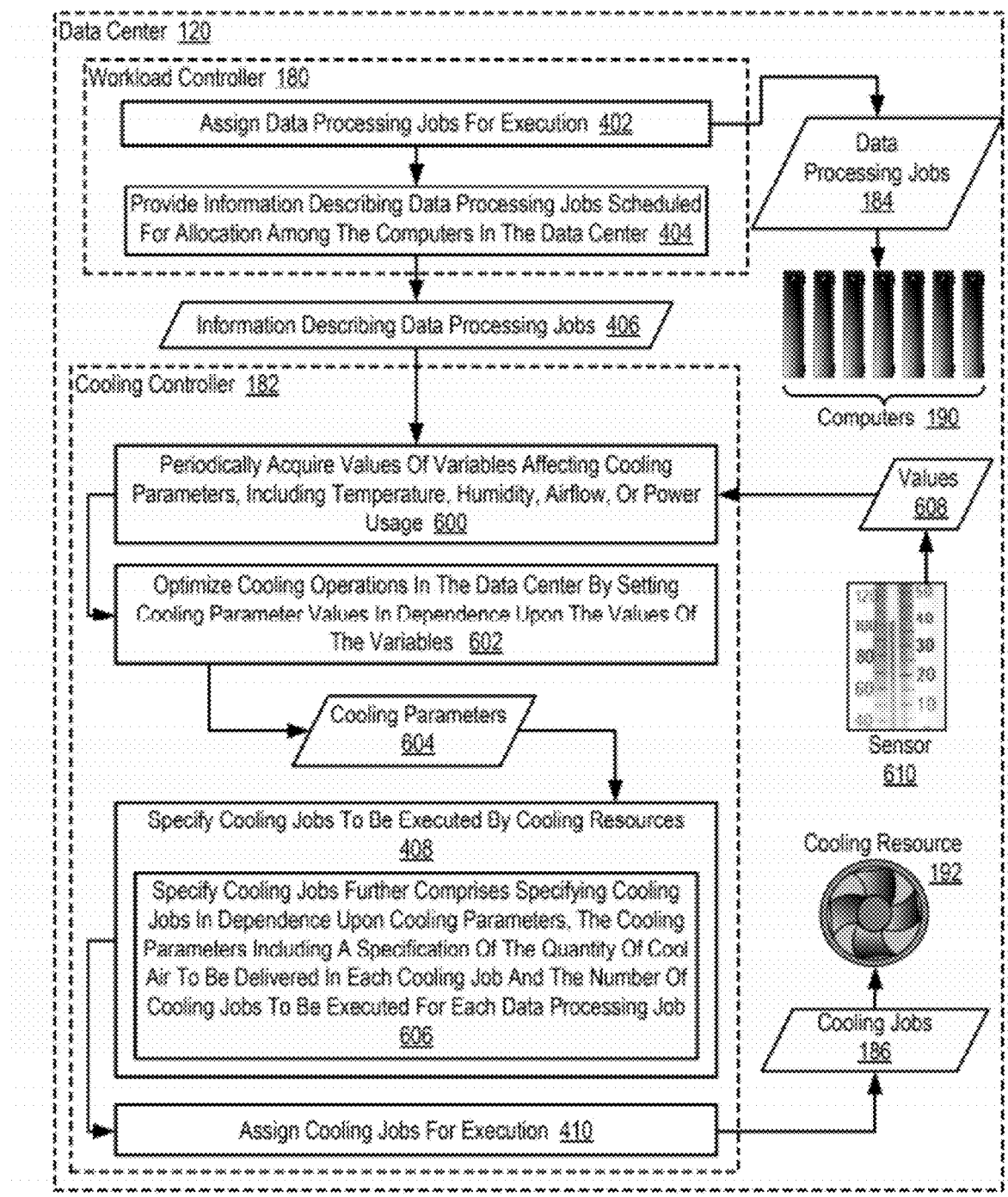
FIG. 5 sets forth a flow chart illustrating an example method of scheduling cool air jobs in a data center according to embodiments of the present invention.

For further explanation, FIG. 5 sets forth a flow chart illustrating a further example method for scheduling cool air jobs in a data center according to embodiments of the present invention. The method of FIG. 5 is similar to the method of FIG. 3, including as it does, assigning (402) data processing jobs for execution by computers in the data center, providing (404) information describing data processing jobs scheduled for allocation among the computers in the data center, specifying (408) cooling jobs to be executed by cooling resources, and assigning (410), by the cooling controller (182) in accordance with the workload allocation schedule to cooling resources (192) in the data center (120), cooling jobs (186) for execution. The method of FIG. 5 is implemented in a data center with a data processing job controller, a cooling job controller, and cooling resources similar to those depicted in and described above with regard to FIG. 1.

In the method of FIG. 5, however, specifying (408) cooling jobs to be executed by cooling resources (192) includes specifying (606) cooling jobs in dependence upon cooling parameters (604), where the cooling parameters include a specification of the quantity of cool air to be delivered in each cooling job and the number of cooling jobs to be executed for each data processing job. Cooling parameters are further described with reference to Table 3.

TABLE 3

Cooling Parameters Table

| Cooling Parameter ID | Description | Value | Units |
|---|---|---|---|
| 0001 | Quantity Of Cool Air Per Job | 1000 | Cubic feet |
| 0002 | Number Of Cooling Jobs Per Data Processing Job | 5 | N/A |
| 0003 | Cool Air Temperature | 65 | Degrees Fahrenheit |

Each record in Table 3 represents cooling parameters that include a specification of the quantity of cool air to be delivered in each cooling job and the number of cooling jobs to be executed for each data processing job. Such cooling parameters are used by the cooling controller to specify (408) cooling jobs to be executed by cooling resources (192) in the data center (120) of FIG. 5.

The method of FIG. 5 also includes periodically (600) acquiring through sensors values (608) of variables affecting cooling parameters (604). In the method of FIG. 5, the variables affecting cooling parameters (604) include one or more of temperature, humidity, airflow, and power usage. Values of such variables are captured through the use of a sensor (610). In the method of FIG. 5, a sensor can be embodied as a thermometer, hygrometer, an air flow meter, an electric meter, and so on as will occur to those of skill in the art.

The method of FIG. 5 also includes optimizing (602) cooling operations in the data center by setting cooling parameter (604) values in dependence upon the values (608) of the variables acquired through sensors (610). Setting cooling parameter (604) values in dependence upon the values (608) of the variables acquired through sensors (610) can be carried out, for example, by increasing the quantity of cool air to be delivered in each cooling job, as specified in the cooling parameters, as the temperature, humidity, or power usage increases, or air flow decreases. Setting cooling parameter (604) values in dependence upon the values (608) of the variables acquired through sensors (610) can be carried out, for example, by increasing the number of cooling jobs to be executed for each data processing job, as specified in the cooling parameters, as the temperature, humidity, or power usage increases, or air flow decreases. In the method of FIG. 5, as the temperature, humidity, or power usage decreases, or air flow increases, the quantity of cool air to be delivered in each cooling job and the number of cooling jobs to be executed for each data processing job, as specified in the cooling parameters, can be decreased to optimize cool air operations in the data center.

Figure 6:
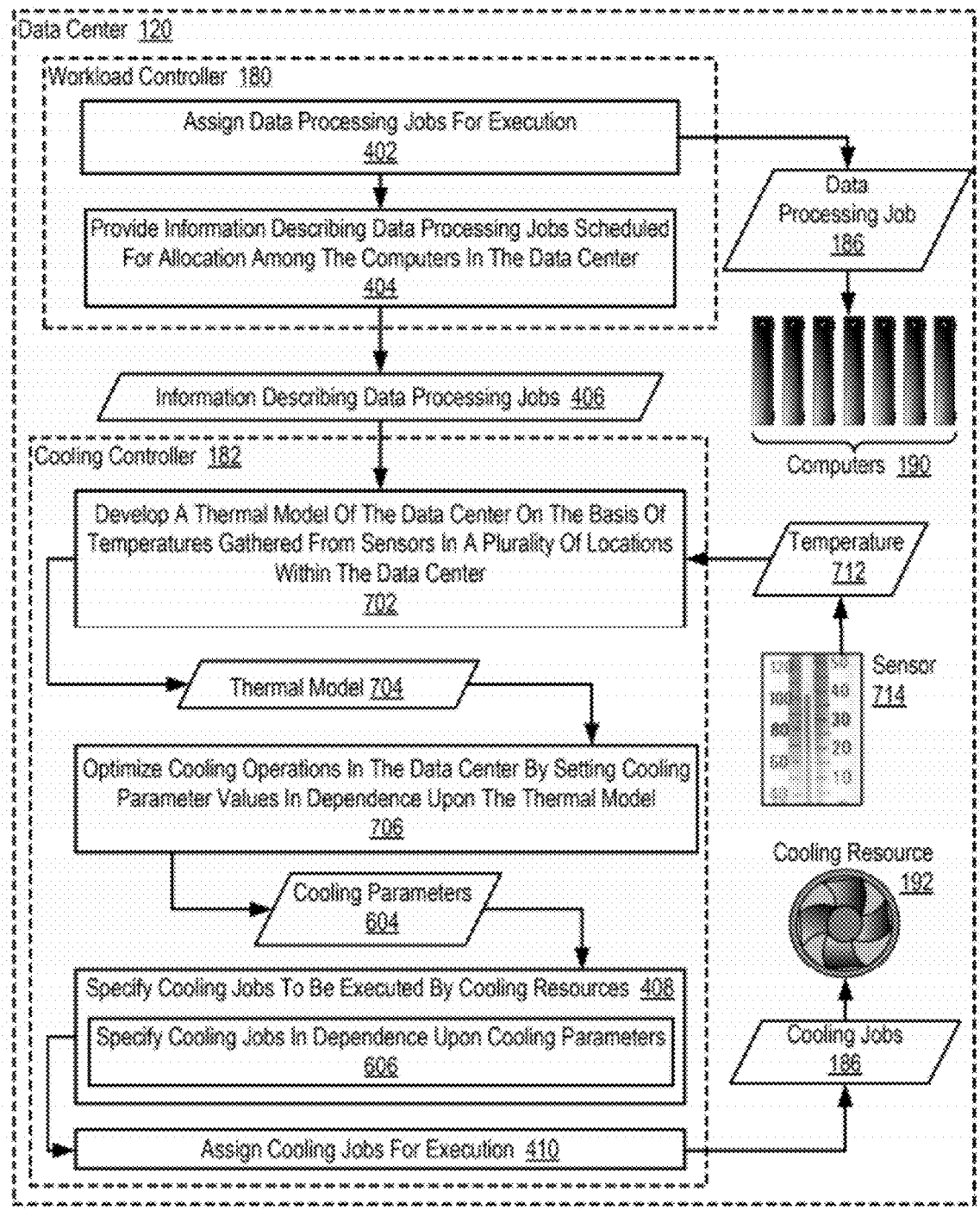
FIG. 6 sets forth a flow chart illustrating an example method of scheduling cool air jobs in a data center according to embodiments of the present invention.

For further explanation, FIG. 6 sets forth a flow chart illustrating a further example method for scheduling cool air jobs in a data center according to embodiments of the present invention. The method of FIG. 6 is similar to the method of FIG. 3, including as it does, assigning (402) data processing jobs for execution by computers in the data center, providing (404) information describing data processing jobs scheduled for allocation among the computers in the data center, specifying (408) cooling jobs to be executed by cooling resources, and assigning (410), by the cooling controller (182) in accordance with the workload allocation schedule to cooling resources (192) in the data center (120), cooling jobs (186) for execution, and specifying cooling jobs in dependence upon cooling parameters (606). The method of FIG. 6 is implemented in a data center with a data processing job controller, a cooling job controller, and cooling resources similar to those depicted in and described above with regard to FIG. 1.

The method of FIG. 6, however, also includes developing (702) a thermal model (704) of the data center (120) on the basis of temperatures (712) gathered from sensors (714) in a plurality of locations within the data center. In the method of FIG. 6, such sensors (714) can be embodied as a thermometer or any other device capable of determining air temperature. A thermal model (704) is further described with reference to Table 4.

TABLE 4

Thermal Model

| Grid Location | Temperature | Time Stamp |
|---|---|---|
| 01 | 70 | 01:15 |
| 02 | 72 | 01:15 |
| 03 | 74 | 01:15 |
| 04 | 76 | 01:15 |
| 01 | 72 | 01:20 |
| 02 | 72 | 01:20 |
| 03 | 73 | 01:20 |
| 04 | 75 | 01:20 |
| 01 | 74 | 01:25 |
| 02 | 72 | 01:25 |
| 03 | 72 | 01:25 |
| 04 | 74 | 01:25 |

Each record in Table 4 represents the temperature sensed at a particular grid location in the data center at a particular time. Such information can be used to develop a thermal model that depicts trends in temperature over time. It would typically be of interest, for example, to model trends at locations in the data center as the overall data processing workload varies in a typical 24-hour processing cycle.

The method of FIG. 6 also includes optimizing (706) cooling operations in the data center by setting cooling parameter values in dependence upon the thermal model. Optimizing cooling operations in dependence upon the thermal model can be carried out by increasing or decreasing the quantity of cool air to be delivered in each cooling job and the number of cooling jobs to be executed for each data processing job, as specified in the cooling parameters, in dependence upon the thermal model. If the thermal model indicates, for example, that the air temperature at a particular grid in the data center is trending upwards, the quantity of cool air to be delivered in each cooling job and the number of cooling jobs to be executed for each data processing job can be increased in the cooling parameters. If the thermal model indicates that the air temperature at a particular grid in the data center is trending downwards to acceptable temperature levels, the quantity of cool air to be delivered in each cooling job and the number of cooling jobs to be executed for each data processing job can be decreased in the cooling parameters. Such actions optimize cooling operations in the data center because the cool air provided by the cooling resources is directed to where it is needed the most—those areas in the data center where the air temperature is trending higher than desired.

Readers will recognize that although the method of FIG. 6 affects cooling parameters, nothing in the method of FIG. 6 is to be interpreted as scheduling cool air jobs in a data center in dependence upon the current temperature in the data center. Such methodology is old and slow. Readers will recognize that the benefits of scheduling cool air jobs according to embodiments of the present invention include the fact that cooling jobs can be and are scheduled according to embodiments of the present invention to arrive at the same time the pertinent data processing begins on the target computer in the data center—well ahead of any change in temperature in the data center caused by a data processing workload—and with absolutely no regard or dependence whatsoever upon any current actual temperature in the data center.

Example embodiments of the present invention are described largely in the context of a fully functional computer system for scheduling cool air jobs in a data center. Readers of skill in the art will recognize, however, that the present invention also may be embodied in a computer program product disposed on recordable media for machine-readable information, including magnetic media, optical media, or other suitable media. Examples of recordable media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a program product. Persons skilled in the art will recognize immediately that, although some of the example embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of scheduling cool air jobs in a data center, the data center comprising computers whose operations produce heat and require cooling, cooling resources that provide cooling for the data center, a workload controller that schedules and allocates data processing jobs among the computers in the data center, a cooling controller that schedules and allocates cooling jobs among cooling resources in the data center, the method comprising:

assigning by the workload controller data processing jobs for execution by computers in the data center, a time when the workload controller assigns each data processing job defining a data processing workload schedule;

providing, from the workload controller to the cooling controller, information describing data processing jobs scheduled for allocation among the computers in the data center, the information including the physical location of the computer to which each job is allocated, the quantity of data processing represented by each job, and the data processing workload schedule;

specifying, by the cooling controller in dependence upon the physical location of the computer to which each job is allocated and the quantity of data processing represented by each job, cooling jobs to be executed by cooling resources, each cooling job comprising a quantity of cool air to be delivered to a physical location in the data center; and assigning, by the cooling controller in accordance with the workload allocation schedule to cooling resources in the data center, cooling jobs for execution.

2. The method of claim 1 wherein:

providing information describing data processing jobs further comprises providing information describing job priority for each data processing job and the type of application to be executed in each data processing job; and specifying cooling jobs further comprises specifying cooling jobs in dependence upon job priority for each data processing job and the type of application to be executed in each data processing job.

3. The method of claim 1 wherein the cooling resources are disposed within the data center so as to provide cool air to the computers in the data center in a pattern of a grid.

4. The method of claim 1 wherein specifying cooling jobs further comprises specifying cooling jobs in dependence upon cooling parameters, the cooling parameters including a specification of the quantity of cool air to be delivered in each cooling job and the number of cooling jobs to be executed for each data processing job.

5. The method of claim 1 wherein:

specifying cooling jobs further comprises specifying cooling jobs in dependence upon cooling parameters;

the method further comprises periodically acquiring through sensors values of variables affecting cooling parameters, the variables including one or more of: temperature, humidity, airflow, and power usage; and optimizing cooling operations in the data center by setting cooling parameter values in dependence upon the values of the variables acquired through sensors.

6. The method of claim 1 wherein:

specifying cooling jobs further comprises specifying cooling jobs in dependence upon cooling parameters;

the method further comprises developing a thermal model of the data center on the basis of temperatures gathered from sensors in a plurality of locations within the data center; and optimizing cooling operations in the data center by setting cooling parameter values in dependence upon the thermal model.

7. Apparatus for scheduling cool air jobs in a data center, the data center comprising computers whose operations produce heat and require cooling, cooling resources that provide cooling for the data center, a workload controller that schedules and allocates data processing jobs among the computers in the data center, a cooling controller that schedules and allocates cooling jobs among cooling resources in the data center, the apparatus comprising a computer processor, a computer memory operatively coupled to the computer processor, the computer memory having disposed within it computer program instructions which, when executed, cause the apparatus to carry out the steps of:

assigning by the workload controller data processing jobs for execution by computers in the data center, a time when the workload controller assigns each data processing job defining a data processing workload schedule;

providing, from the workload controller to the cooling controller, information describing data processing jobs scheduled for allocation among the computers in the data center, the information including the physical location of the computer to which each job is allocated, the quantity of data processing represented by each job, and the data processing workload schedule;

specifying, by the cooling controller in dependence upon the physical location of the computer to which each job is allocated and the quantity of data processing represented by each job, cooling jobs to be executed by cooling resources, each cooling job comprising a quantity of cool air to be delivered to a physical location in the data center; and assigning, by the cooling controller in accordance with the workload allocation schedule to cooling resources in the data center, cooling jobs for execution.

8. The apparatus of claim 7 wherein:

providing information describing data processing jobs further comprises providing information describing job priority for each data processing job and the type of application to be executed in each data processing job; and specifying cooling jobs further comprises specifying cooling jobs in dependence upon job priority for each data processing job and the type of application to be executed in each data processing job.

9. The apparatus of claim 7 wherein the cooling resources are disposed within the data center so as to provide cool air to the computers in the data center in a pattern of a grid.

10. The apparatus of claim 7 wherein specifying cooling jobs further comprises specifying cooling jobs in dependence upon cooling parameters, the cooling parameters including a specification of the quantity of cool air to be delivered in each cooling job and the number of cooling jobs to be executed for each data processing job.

11. The apparatus of claim 7 wherein:

specifying cooling jobs further comprises specifying cooling jobs in dependence upon cooling parameters;

the apparatus further comprises computer program instructions which, when executed, cause the apparatus to carry out the steps of:

periodically acquiring through sensors values of variables affecting cooling parameters, the variables including one or more of: temperature, humidity, airflow, and power usage; and optimizing cooling operations in the data center by setting cooling parameter values in dependence upon the values of the variables acquired through sensors.

12. The apparatus of claim 7 wherein:

specifying cooling jobs further comprises specifying cooling jobs in dependence upon cooling parameters;

the apparatus further comprises computer program instructions which, when executed, cause the apparatus to carry out the steps of:

developing a thermal model of the data center on the basis of temperatures gathered from sensors in a plurality of locations within the data center; and optimizing cooling operations in the data center by setting cooling parameter values in dependence upon the thermal model.

13. A computer program product for scheduling cool air jobs in a data center, the data center comprising computers whose operations produce heat and require cooling, cooling resources that provide cooling for the data center, a workload controller that schedules and allocates data processing jobs among the computers in the data center, a cooling controller that schedules and allocates cooling jobs among cooling resources in the data center, the computer program product disposed in a recordable medium for machine-readable information, wherein the recordable medium for machine-readable information is not a signal, the computer program product comprising computer program instructions which, when executed, cause automated computing machinery to carry out the steps of:

assigning by the workload controller data processing jobs for execution by computers in the data center, a time when the workload controller assigns each data processing job defining a data processing workload schedule;

providing, from the workload controller to the cooling controller, information describing data processing jobs scheduled for allocation among the computers in the data center, the information including the physical location of the computer to which each job is allocated, the quantity of data processing represented by each job, and the data processing workload schedule;

specifying, by the cooling controller in dependence upon the physical location of the computer to which each job is allocated and the quantity of data processing represented by each job, cooling jobs to be executed by cooling resources, each cooling job comprising a quantity of cool air to be delivered to a physical location in the data center; and assigning, by the cooling controller in accordance with the workload allocation schedule to cooling resources in the data center, cooling jobs for execution.

14. The computer program product of claim 13 wherein:

providing information describing data processing jobs further comprises providing information describing job priority for each data processing job and the type of application to be executed in each data processing job; and specifying cooling jobs further comprises specifying cooling jobs in dependence upon job priority for each data processing job and the type of application to be executed in each data processing job.

15. The computer program product of claim 13 wherein the cooling resources are disposed within the data center so as to provide cool air to the computers in the data center in a pattern of a grid.

16. The computer program product of claim 13 wherein specifying cooling jobs further comprises specifying cooling jobs in dependence upon cooling parameters, the cooling parameters including a specification of the quantity of cool air to be delivered in each cooling job and the number of cooling jobs to be executed for each data processing job.

17. The computer program product of claim 13 wherein:

specifying cooling jobs further comprises specifying cooling jobs in dependence upon cooling parameters;

the computer program product further comprises computer program instructions which, when executed, cause automated computing machinery to carry out the steps of:

the method further comprises periodically acquiring through sensors values of variables affecting cooling parameters, the variables including one or more of: temperature, humidity, airflow, and power usage; and optimizing cooling operations in the data center by setting cooling parameter values in dependence upon the values of the variables acquired through sensors.

18. The computer program product of claim 13 wherein:
specifying cooling jobs further comprises specifying cooling jobs in dependence upon cooling parameters;
the computer program product further comprises computer program instructions which, when executed, cause automated computing machinery to carry out the steps of:

developing a thermal model of the data center on the basis of temperatures gathered from sensors in a plurality of locations within the data center; and
optimizing cooling operations in the data center by setting cooling parameter values in dependence upon the thermal model.

* * * * *